United States Patent
Catlin et al.

(10) Patent No.: US 10,155,483 B2
(45) Date of Patent: Dec. 18, 2018

(54) VEHICLE INTERIOR COMPONENT

(71) Applicant: Shanghai Yanfeng Jinqiao Automotive Trim Systems Co. Ltd, Novi, MI (US)

(72) Inventors: Michael Robert Catlin, Holland, MI (US); Thomas Scott Hodgson, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 15/828,832

(22) Filed: Dec. 1, 2017

(65) Prior Publication Data

US 2018/0079369 A1  Mar. 22, 2018

Related U.S. Application Data

(63) Continuation-in-part of application No. PCT/US2016/036450, filed on Jun. 8, 2016.
(Continued)

(51) Int. Cl.
*H04M 1/00* (2006.01)
*B60R 11/02* (2006.01)
*B60R 11/00* (2006.01)

(52) U.S. Cl.
CPC ... *B60R 11/0241* (2013.01); *B60R 2011/0005* (2013.01); *B60R 2011/0071* (2013.01); *B60R 2011/0082* (2013.01)

(58) Field of Classification Search
CPC ...... H04B 1/3877; H04B 1/082; H04B 1/086; B60R 11/02
(Continued)

(56) References Cited

U.S. PATENT DOCUMENTS 4,696,033 A * 9/1987 Else .................. H04M 1/08
                                                     379/424
5,556,017 A * 9/1996 Troy .................. B60R 11/0241
                                                     224/275
(Continued)

FOREIGN PATENT DOCUMENTS

DE        20206190 U1    8/2002
DE    102011109056 A1    1/2013
(Continued)

OTHER PUBLICATIONS

International Search Report and Written Opinion from the International Searching Authority of the Patent Cooperation Treaty for WO Patent Application No. PCT/US2016/036450 dated Sep. 14, 2016 (in English) (11 pages).

*Primary Examiner* — Sonny Trinh

(57) ABSTRACT

A component for a vehicle interior to position a mobile device in the vehicle interior is disclosed. The component may comprise a base and a mechanism coupled to the base with a shelf configured to move from a retracted position to an extended position. The shelf may support the mobile device in the extended position. The base may comprise a storage area and the mechanism may cover the storage area when the shelf is in the extended position. The mechanism may descend from the base to move the shelf from the extended position to the retracted position. The mechanism may comprise a lower arm coupled to an upper arm by a pin and a spring. The lower arm may slide and rotate to move the shelf between the retracted position and the extended position. The component may comprise a locking mechanism to lock the shelf in the extended position.

20 Claims, 11 Drawing Sheets

Related U.S. Application Data

(60) Provisional application No. 62/173,254, filed on Jun. 9, 2015.

(58) Field of Classification Search
USPC .............. 455/575.9, 569.1, 569.2; 361/807, 361/679.01, 679.09, 679.26, 679.56
See application file for complete search history.

(56) References Cited

U.S. PATENT DOCUMENTS

| | | | |
|---|---|---|---|
| 8,172,293 B2 | 5/2012 | Lota et al. | |
| 8,202,114 B2 | 6/2012 | Zilmer et al. | |
| 8,910,990 B1 | 12/2014 | Oldani et al. | |
| 9,014,393 B2 * | 4/2015 | Huh | B60R 11/02 381/386 |
| 9,270,318 B2 * | 2/2016 | Rassent | H04B 1/3877 |
| 9,318,906 B2 | 4/2016 | Kim | |
| 9,446,720 B1 * | 9/2016 | Prazeres | B60R 11/0258 |
| 10,086,771 B2 | 10/2018 | Barre et al. | |
| 2010/0096875 A1 * | 4/2010 | Nutt | B60R 11/02 296/37.8 |
| 2012/0033371 A1 * | 2/2012 | Pankros | F16M 11/08 361/679.21 |
| 2014/0091192 A1 * | 4/2014 | Mersky | F16M 11/041 248/447 |
| 2014/0354002 A1 * | 12/2014 | Bisceglia | B60R 11/02 296/37.12 |
| 2015/0258941 A1 | 9/2015 | Sanchez | |
| 2015/0350397 A1 * | 12/2015 | Vourlat | B60R 11/0235 455/575.9 |

FOREIGN PATENT DOCUMENTS

| | | |
|---|---|---|
| DE | 102013106649 A1 | 9/2014 |
| EP | 2546105 A1 | 1/2013 |
| JP | 2013256240 A | 12/2013 |
| WO | 2013068316 A1 | 5/2013 |

\* cited by examiner

VEHICLE INTERIOR COMPONENT

CROSS-REFERENCE TO RELATED PATENT APPLICATIONS

The present application is a continuation in part of International Application No. PCT/US16/36450 titled "Vehicle Interior Component" filed on Jun. 8, 2016. The present application claims priority from and benefit of and incorporates by reference in entirety the following applications: (a) International Application No. PCT/US16/36450 titled "Vehicle Interior Component" filed on Jun. 8, 2016; and (b) U.S. Provisional Application No. 62/173,254 titled "Apparatus for Electronic Device Management for Vehicle Interior" filed on Jun. 9, 2015.

FIELD

The present invention relates to a vehicle interior component.

The present invention also relates to a component such as an apparatus configured to position a mobile device in a vehicle interior.

BACKGROUND

It is known to provide a component in a vehicle interior to hold a mobile device such that it is accessible to a driver of an automobile. The mobile device may be operated by removing the mobile device from the mechanism. The mobile device may be connected to a known connector for hands-free operation so that the mobile device can be used while driving.

It would be advantageous to provide an improved component in a vehicle interior to hold multiple different sized mobile devices in multiple positions. It would also be advantageous to provide a component in a vehicle interior in a retracted position when not in use and moveable by pressing against the component with a mobile device to an extended position for use in holding the mobile device. It would also be advantageous to provide a mechanism to return the component from the extended position to the retracted position. It would be further advantageous to provide a locking mechanism to lock the component in the extended position.

SUMMARY

The present invention further relates to a component for a vehicle interior. The component may be configured to position a mobile device for use in the vehicle interior. The component may comprise a base and a mechanism coupled to the base. The mechanism may comprise a shelf. The shelf may be configured to move from a retracted position to an extended position. The shelf may be configured to support the mobile device in the extended position. The mechanism may comprise a lower arm and an upper arm. The lower arm may be configured to move the shelf relative to the base between the retracted position and the extended position. The lower arm may be configured to slide and rotate relative to the base to move the shelf between the retracted position and the extended position. The upper arm may be configured to rotate relative to the base to move the shelf relative to the base between the retracted position and the extended position. The component may comprise a pin. The pin may be configured to facilitate rotation between the upper arm and the lower arm. The component may comprise a spring. The spring may be configured to couple the lower arm to the upper arm. The spring may be configured to bias the shelf toward the retracted position.

The present invention also relates to a component for a vehicle interior. The component may be configured to position a mobile device for use in the vehicle interior. The component may comprise a base and a mechanism coupled to the base. The mechanism may comprise a shelf. The shelf may be configured to move from a retracted position to an extended position. The shelf may be configured to support the mobile device in the extended position. The mechanism may be configured to descend from the base to move the shelf from the retracted position to the extended position. The base may comprise a storage area. The storage area may be exposed when the shelf assembly is in the retracted position. The base may comprise a storage area. The mechanism may at least partially cover the storage area when the shelf is in the extended position. The mechanism may be configured to clamp the mobile device between the shelf and the base when the shelf is in the extended position. The shelf may comprise an opening for a cable extending from the mobile device. The mechanism may comprise a first arm coupled to the base and a second arm coupled to the base. The first arm and the second arm may be configured to guide movement of the shelf between the retracted position and the extended position.

The present invention further relates to a component for a vehicle interior. The component may be configured to position a mobile device for use in the vehicle interior. The component may comprise a base and a mechanism coupled to the base. The mechanism may comprise a shelf. The shelf may be configured to move from a retracted position to an extended position. The shelf may be configured to support the mobile device in the extended position. The component may comprise a locking mechanism. The locking mechanism may be configured to lock the shelf in the extended position. The locking mechanism may comprise at least one locking arm. The locking arm may be configured to engage the mechanism to lock the shelf in the extended position. The locking mechanism may comprise a button. The locking mechanism may comprise a latch feature. The button may comprise a latch feature. The latch feature of the button may be configured to engage the latch feature of the locking mechanism to allow movement of the shelf relative to the base. The latch feature of the button may be configured to disengage from the latch feature of the mechanism to block movement of the shelf relative to the base. The locking arm may be configured to rotate in response to actuation of the button to engage the mechanism to lock the shelf in the extended position. The locking mechanism may comprise a spring. The spring may be configured to rotate the locking arm to engage the locking arm with the mechanism to lock the shelf in the extended position. The button may comprise a surface configured to rotate the locking arm to disengage the locking arm from the mechanism. The mechanism may comprise a set of teeth. The locking arm may comprise a set of teeth. The set of teeth of the locking arm may be configured to engage the set of teeth of the mechanism to lock the shelf in the extended position.

FIGURES

DESCRIPTION

Figure 1A:
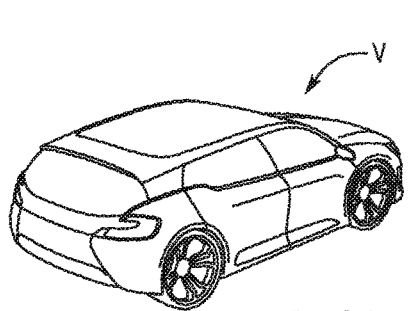
FIG. 1A is a schematic perspective view of a vehicle according to an exemplary embodiment.
Figure 1B:
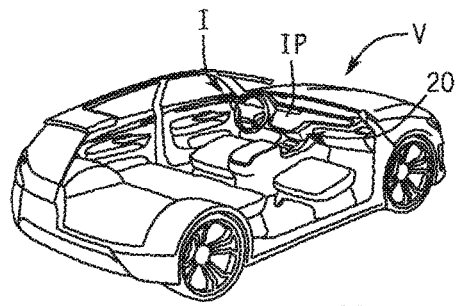
FIG. 1B is a schematic perspective cut-away view of a vehicle showing a vehicle interior according to an exemplary embodiment.

According to an exemplary embodiment as shown schematically in FIG. 1A a vehicle V is shown that may include a component 20 with a mechanism 100 (e.g., a support mechanism) (see FIG. 1C). FIG. 1B is a schematic perspective view showing the interior I of the vehicle V with an instrument panel IP. An apparatus or component 20 may be positioned within the interior I of the vehicle V. According to an exemplary embodiment, the component 20 may be configured to position, hold, secure, or retain a mobile device in the vehicle interior I such that the mobile device can be accessed and used easily by occupants within the vehicle V. According to an exemplary embodiment, a user may only have to use one hand in order to operate a mechanism of the component and to secure the mobile device within the component.

Figure 2A:
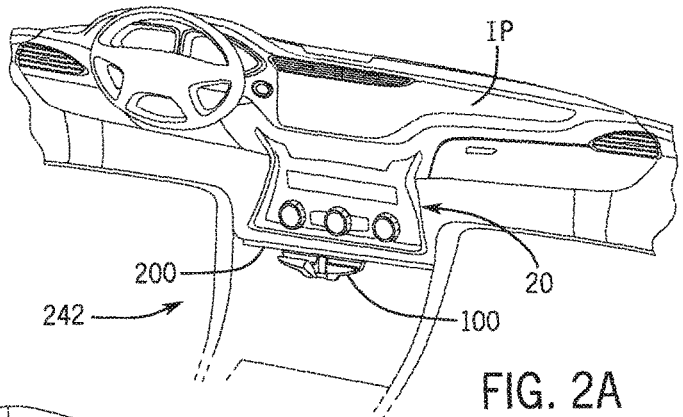
FIG. 2A is a schematic perspective view of a vehicle interior with a vehicle interior component with a shelf in a retracted position according to an exemplary embodiment.
Figure 2B:
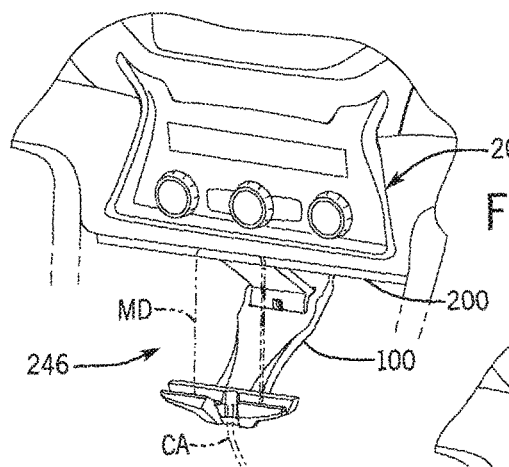
FIG. 2B is a schematic perspective view of a vehicle interior component in an extended position with a mobile device in a portrait position according to an exemplary embodiment.
Figure 2C:
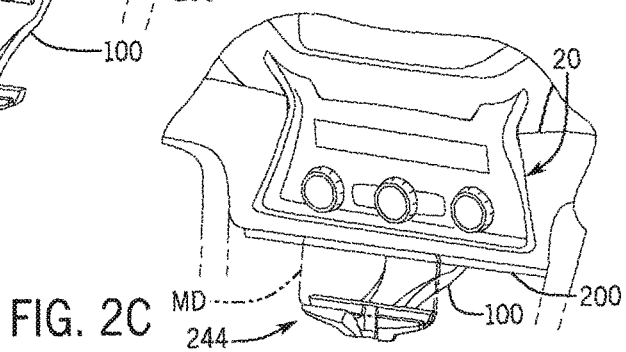
FIG. 2C is a schematic perspective view of a vehicle interior component in an extended position with a mobile device in a landscape position according to an exemplary embodiment.

According to an exemplary embodiment as shown schematically in FIGS. 2A through 2C, component 20 may include a base 200 and a mechanism 100 and may be at least a portion of a console.

According to an exemplary embodiment as shown schematically in FIGS. 2A through 2C, base 200 may be a portion of component 20 secured in vehicle interior I to provide a foundation for securing mechanism 100 and an area for engaging an edge of mobile device MD. According to an exemplary embodiment, base 200 may be a portion of the instrument panel IP.

Mobile device MD is shown schematically in a certain size and configuration according to an exemplary embodiment. A variety of different types and sizes of devices may be used and secured within the component due to the adjustability of the mechanism, including but not limited to mobile phones, smartphones, tablet devices, music players. Any device that (in any orientation) fits the overall geometry of the mechanism of component may be secured within component. Mobile device MD may be connected to and/or removed from a cord or cable (shown as CA) to provide a connection to another device or to a charger for mobile device MD. See FIGS. 2A through 2C.

Figure 5A:
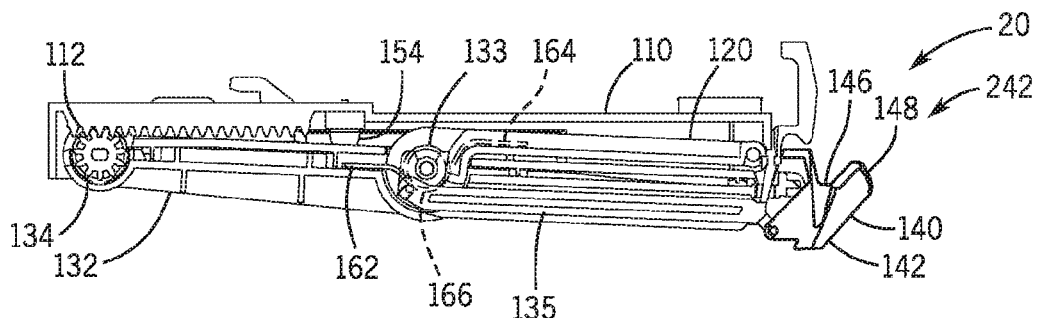
FIG. 5A is a schematic side view of a vehicle interior component in a retracted position according to an exemplary embodiment.
Figure 5B:
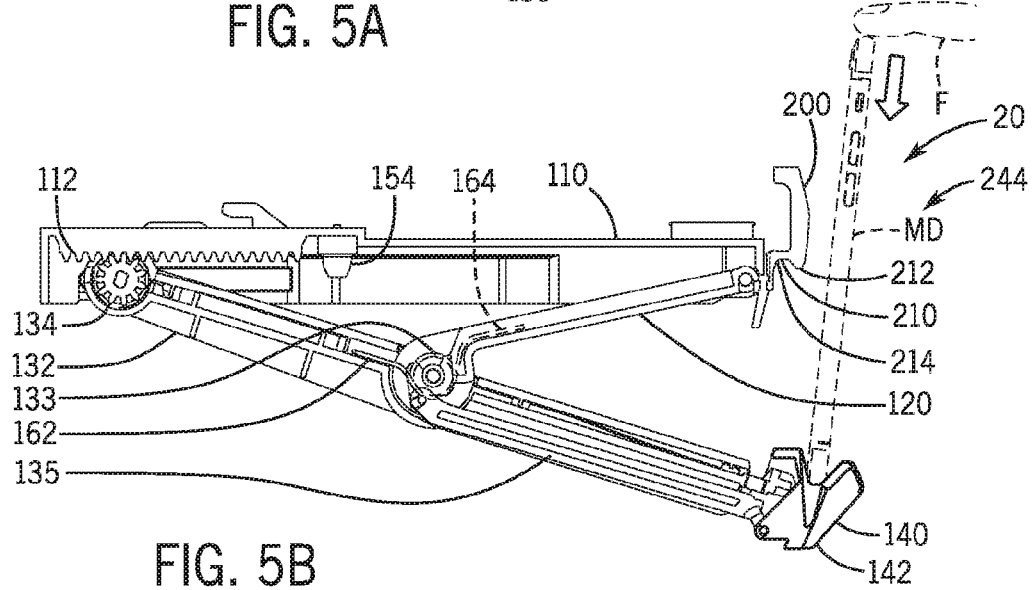
FIG. 5B is a schematic side view of a vehicle interior component in an intermediate position according to an exemplary embodiment.
Figure 5C:
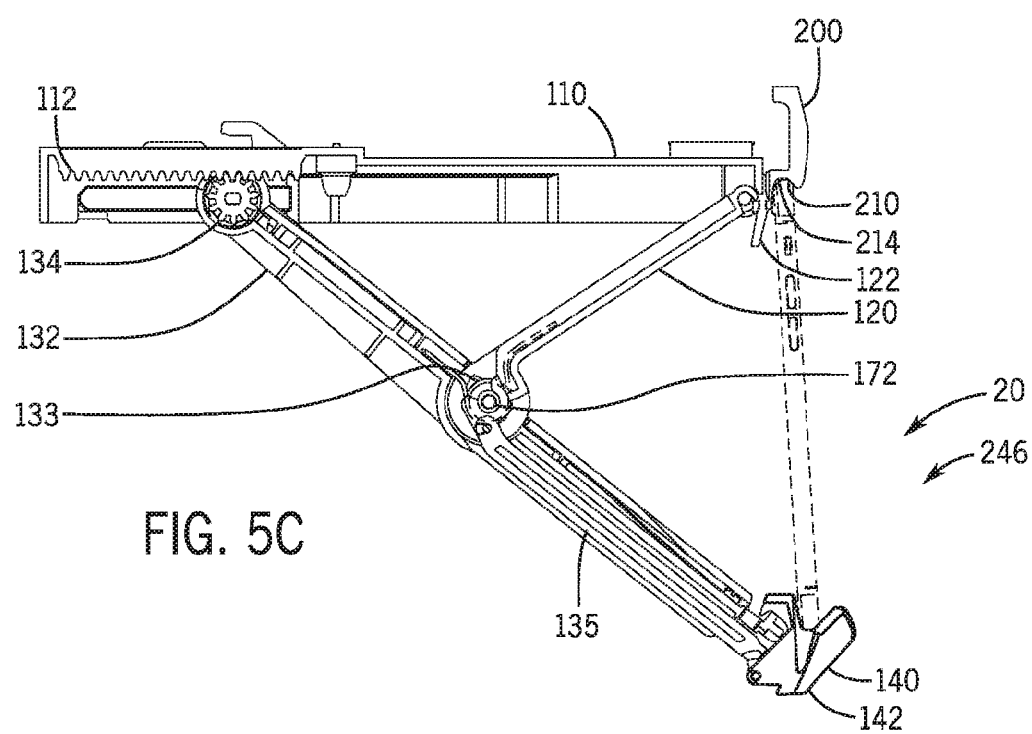
FIG. 5C is a schematic side view of a vehicle interior component in an extended position according to an exemplary embodiment.

According to an exemplary embodiment, base 200 may include an upper clamping surface or member, guide, or retainer 210 for mechanism 100 to engage an edge of mobile device MD and secure mobile device in mechanism 100 as shown schematically in FIGS. 5B and 5C. According to an exemplary embodiment, mechanism 100 may comprise a shelf 142 configured to move from a retracted position 242 as shown schematically in FIGS. 2A and 5A, through an intermediate position 244 as shown schematically in FIGS. 2C and 5B to an extended position 246 as shown schematically in FIGS. 2B and 5C.

According to an exemplary embodiment, shelf 142 may be configured to support mobile device MD in the extended position 246 as shown schematically in FIG. 5C. When shelf 142 is in the extended position 246, retainer 210 of base 200 is configured to receive a top edge of mobile device MD and shelf 142 may press mobile device MD against retainer 210 of base 200. When mobile device MD is in a portrait position and shelf 142 is in the extended position 246 or when mobile device MD is in a landscape position and shelf 142 is in an intermediate position 244, mobile device MD is secured or clamped between retained 210 of base 200 and shelf 142.

According to an exemplary embodiment as shown schematically in FIG. 5B, retainer 210 of base 200 is substantially U-shaped or has a curved profile in order to prevent rotation or movement of mobile device MD when mobile device MD is secured between retainer 210 of base 200 and shelf 142. A front or outer edge 212 of the retainer 210 (e.g., the edge that is closest to the occupants within the vehicle V) may be thicker or extend lower than a middle or inner edge of retainer 210 to create a recessed region 214 for the upper contact surface. The upper edge of mobile device MD may be positioned and secured within recessed region 214 and behind outer edge 212 of retainer 210 of base 200 such that outer edge 212 prevents rotation of mobile device MD.

Figure 4A:
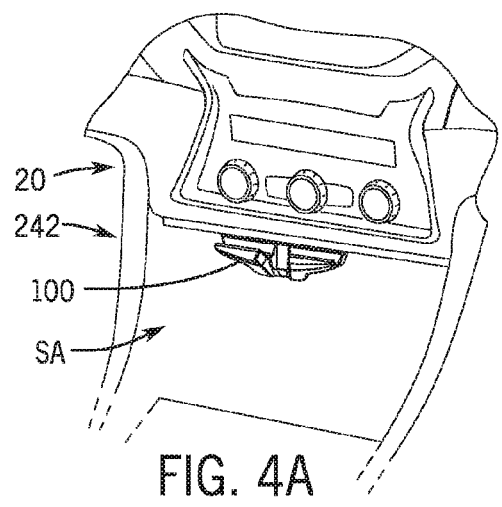
FIG. 4A is a schematic perspective view of a vehicle interior component in a retracted position according to an exemplary embodiment.
Figure 4B:
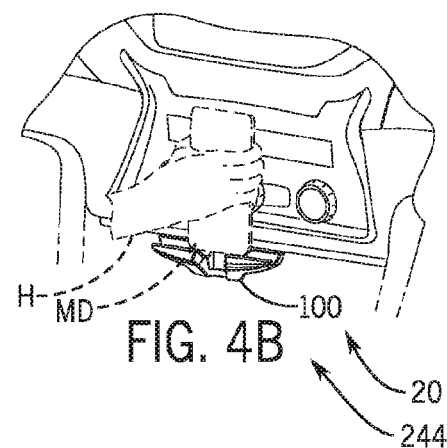
FIG. 4B is a schematic perspective view of a vehicle interior component in an intermediate position according to an exemplary embodiment.
Figure 4C:
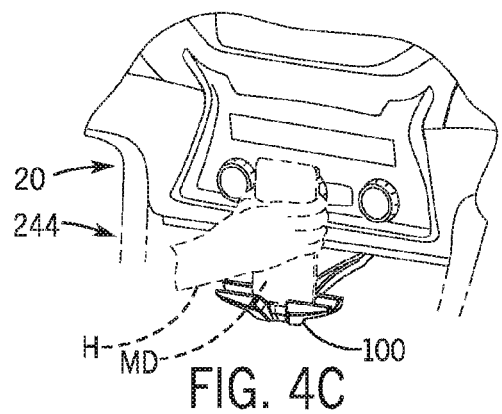
FIG. 4C is a schematic perspective view of a vehicle interior component in an intermediate position according to an exemplary embodiment.
Figure 4D:
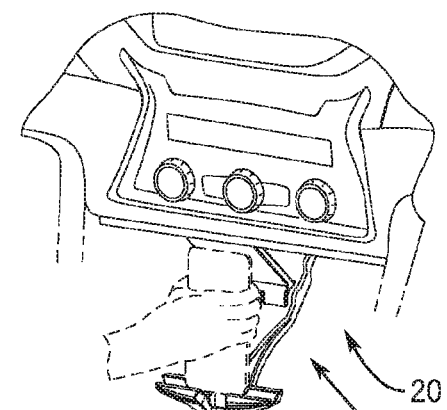
FIG. 4D is a schematic perspective view of a vehicle interior component in an intermediate position according to an exemplary embodiment.
Figure 4E:
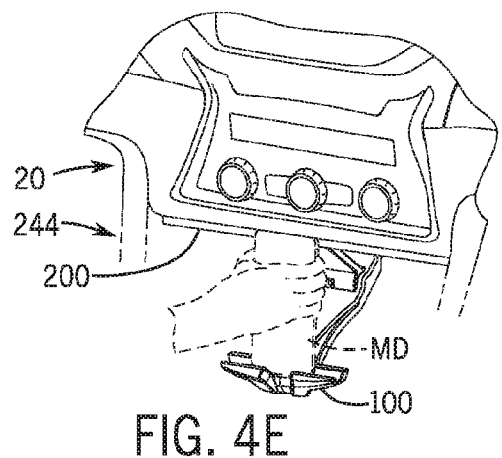
FIG. 4E is a schematic perspective view of a vehicle interior component in an extended position according to an exemplary embodiment.
Figure 4F:
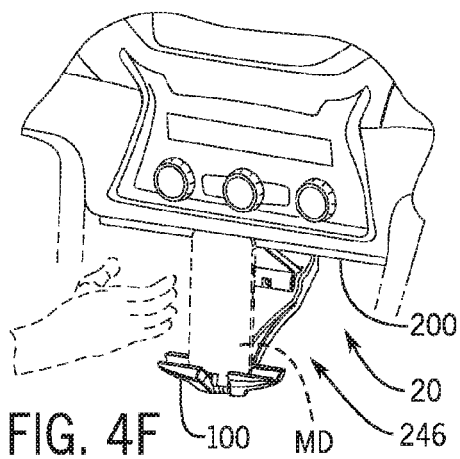
FIG. 4F is a schematic perspective view of a vehicle interior component in an extended position according to an exemplary embodiment.

According to an exemplary embodiment as shown schematically in FIG. 4A, base 200 may include a free space, recess, cavity, or storage area SA that the occupant may use. Various items may be stored behind or beneath mechanism 100 in the storage area SA. When the shelf of mechanism 100 is in a retracted position (and mechanism 100 is not in use), mechanism 100 is at least partially horizontal (in order to take up as little space as possible) and is at least partially hidden from view such that storage area SA is exposed and an occupant can access the storage area SA. When shelf 142 is in the extended position (as shown schematically in FIG. 4F for example), mechanism 100 may at least partially cover or conceal the storage area SA.

According to an exemplary embodiment as shown schematically in FIGS. 4A through 4F, base 200 may include at least a part or portion of an instrument panel IP with various controls that are accessible to occupants within the interior I of the vehicle V.

Figure 3A:
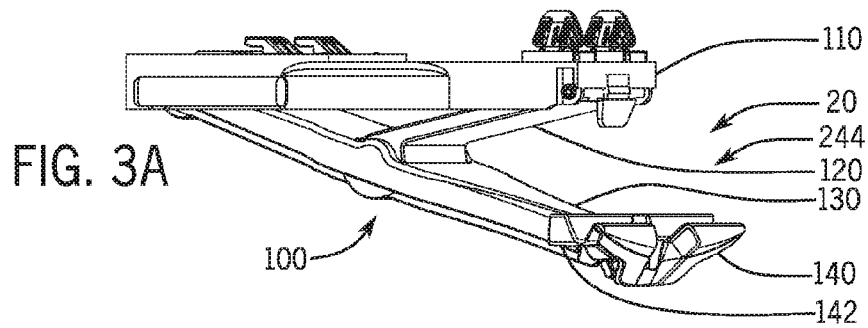
FIG. 3A is a schematic perspective view of a vehicle interior component in an intermediate position according to an exemplary embodiment.
Figure 3B:
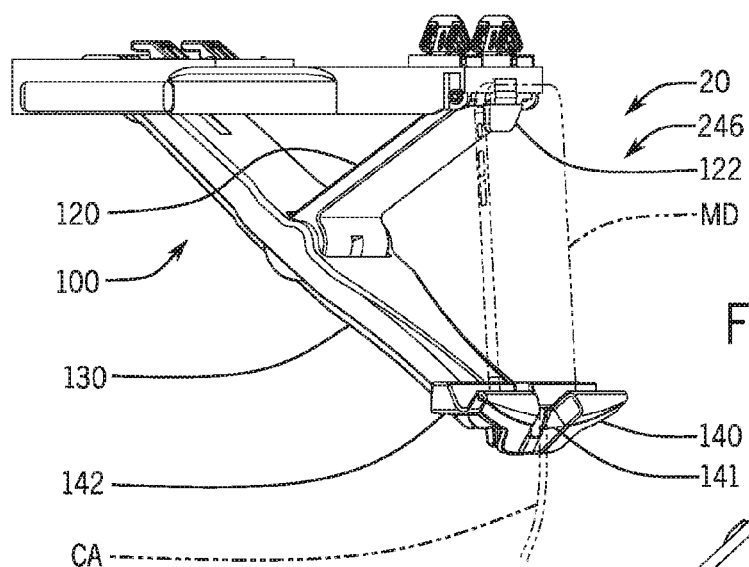
FIG. 3B is a schematic perspective view of a vehicle interior component in an extended position according to an exemplary embodiment.
Figure 3C:
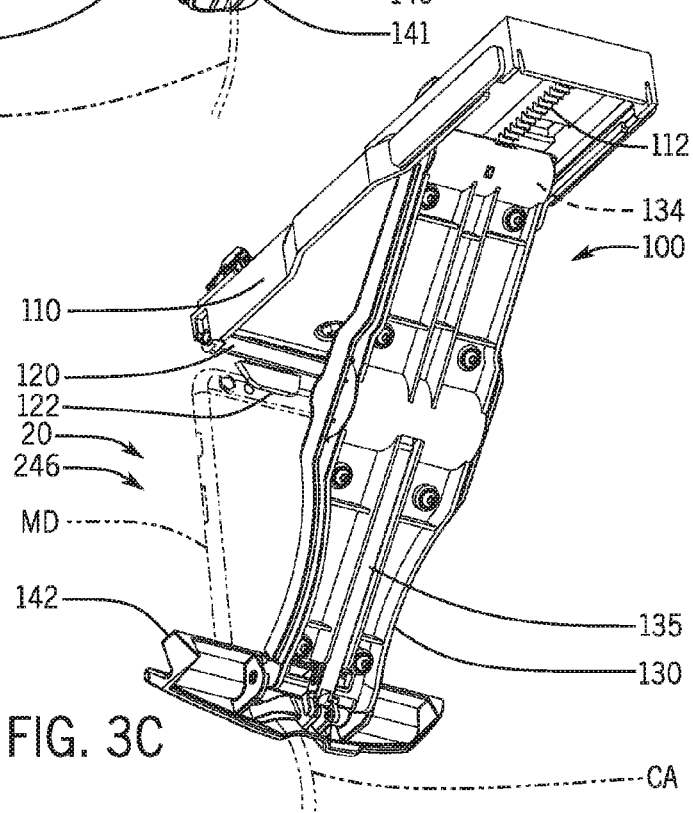
FIG. 3C is a schematic perspective view of a vehicle interior component in an extended position according to an exemplary embodiment.
Figure 3D:
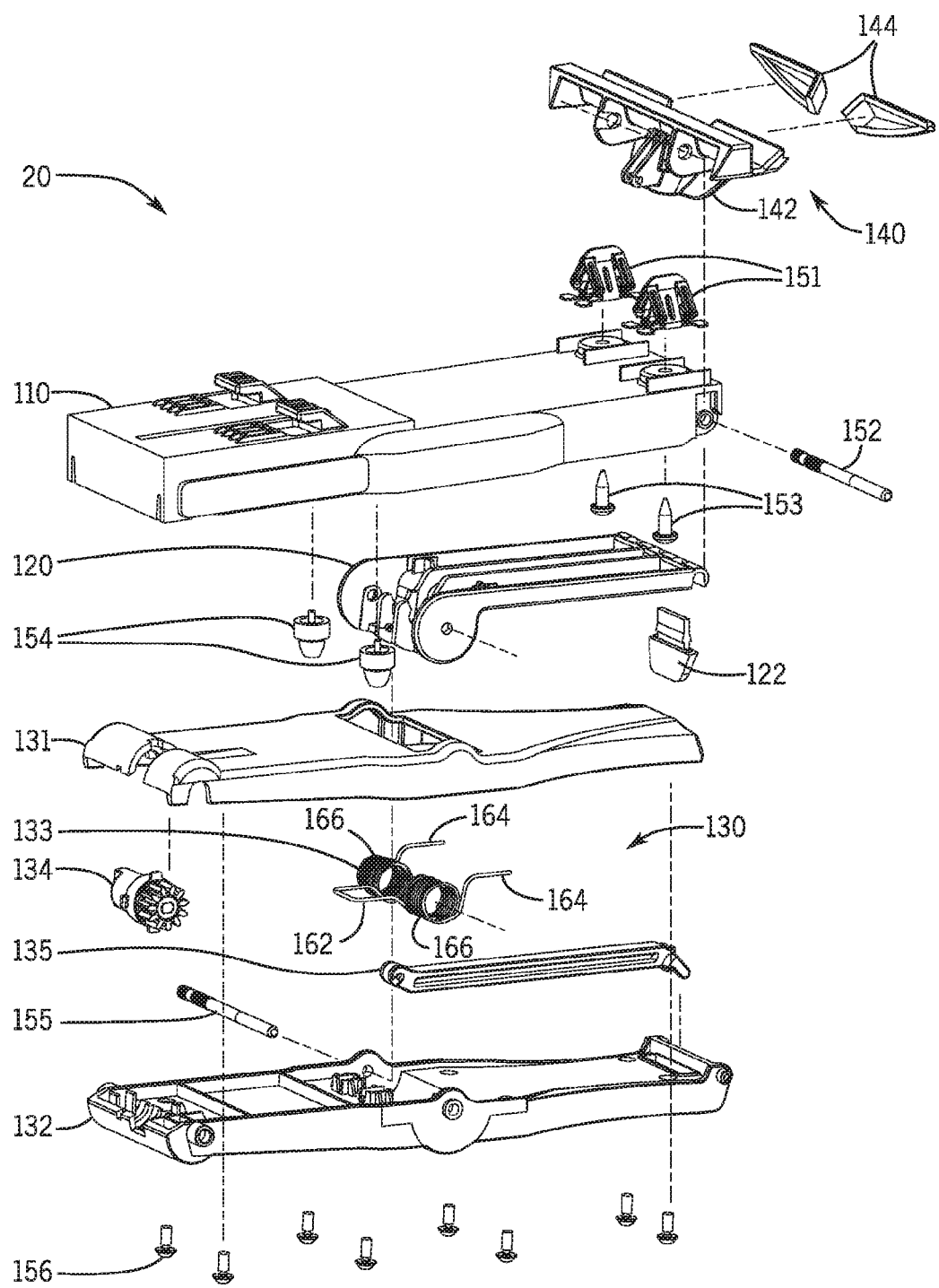
FIG. 3D is a schematic perspective exploded view of a vehicle interior component according to an exemplary embodiment.

According to an exemplary embodiment as shown schematically in FIG. 3D, component 20 may comprise a housing 110, a lower arm assembly 130, an upper arm 120, a spring 133, and a shelf assembly 140. Lower arm assembly 130 may comprise a lower arm cover 131, a spring 133, a damper 134, a guide 135, a lower arm 132 and a pivot pin 155. Shelf assembly 140 may comprise a shelf 142 and fascia 144.

According to an exemplary embodiment as shown schematically in FIGS. 5A through 5C, mechanism, holder mechanism, clamping mechanism, or support mechanism 100 may be configured to hold and secure a mobile device between shelf 142 and base 200 and to move shelf 142 between retracted position 242 and extended position 246. Mechanism 100 may be coupled to and movable relative to base 200. A portion of mechanism 100 may be movable relative to base 200 in order to allow shelf 142 to move between the retracted position 242, the intermediate position 244, and the extended position 246. Mechanism 100 may descend from the instrument panel to move shelf 142 from the retracted position 242 to the extended position 246 and allow the mobile device to be secured. Mechanism 100 may be configured to clamp the mobile device between shelf 142 and base 200 when shelf 142 is in the extended position 246 as shown schematically in FIGS. 4F and 5C.

According to an exemplary embodiment, housing 110 may be a structure that may be coupled in a direct and/or static manner to base 200 to provide support for mechanism 100 as shown schematically in FIGS. 5A-5C. Lower arm assembly 130, upper arm 120 and shelf assembly 140 may be movable and adjustable relative to housing 110. Lower arm assembly 130 may be configured to slide and rotate relative to base 200 to move shelf 142 between the retracted position 242 and the extended position 246. Upper arm 120 may be configured to rotate relative to base 200 to move shelf 142 relative to base 200 between the retracted position 242 and the extended position 246.

According to an exemplary embodiment, housing 110 may include a guide, rack, or damper rail 112 that may extend along at least a portion of housing 110 as shown schematically in FIGS. 3C and 5A-5C. Damper 134 may be moved and guided along damper rail 112 during the movement of shelf 142 between the retracted position 242 and the extended position 246. Damper rail 112 may include notches or gears along its length in order to interlock with and guide the movement of damper 134.

According to an exemplary embodiment, housing 110 may include bumpers 154 that extend from a lower side of housing 110 toward lower arm 132 as shown schematically in FIGS. 3D and 5A-5B. When shelf 142 is in the retracted position 242 such that lower arm 132 is substantially parallel to housing 110, bumpers 154 may abut a portion of lower arm assembly 130 to stop mechanism 100 from moving and to prevent noise and rubbing between housing 110 and lower arm assembly 130.

According to an exemplary embodiment as shown schematically in FIGS. 3B-3D and 5C, mechanism 100 (or base 200) may include a support member, guide, or tab 122 to prevent rotation of mobile device MD and to prevent mobile device MD from falling backward. Tab 122 may extend downward (e.g., toward shelf 142) from housing 110 and may be attached in a static manner to housing 110 (or base 200) such that tab 122 does not move with lower arm assembly 130, upper arm 120, or shelf assembly 140. Tab 122 may be positioned behind recessed region 214 of retainer 210 such that outer edge 212 of retainer 210 is on the other side of recessed region 214 to support mobile device MD. Tab 122 may be at least partially flexible or attached in a rotatable manner.

According to an exemplary embodiment, lower arm assembly 130 may be directly attached to shelf assembly 140 in order to move shelf 142 between the retracted position 242 and the extended position 246. Lower arm assembly 130 may include a lower arm 132 that extends between and is attached in a rotatable manner to housing 110 and shelf assembly 140.

According to an exemplary embodiment, an upper end of lower arm 132 may be attached in a slidable and rotatable manner to a portion of housing 110 (through damper 134) in order to allow a lower end of lower arm assembly 130 to move up and down linearly. The upper end of lower arm 132 may have a pin (or pins) received within and movable (e.g. slidable) along the length of a slot of housing 110. According to an exemplary embodiment, housing 110 may have a pin (or pins) and lower arm 132 may have a receiving slot for the pin. As the upper end of lower arm assembly 130 moves along the length of the slot of housing 110, the lower end of lower arm assembly 130 may be moved up and down linearly. The lower end of the lower arm 132 may be attached in a rotatable manner to an upper portion of shelf assembly 140 at an axis of rotation 174 (see FIG. 6C).

According to an exemplary embodiment as shown schematically in FIG. 3D, lower arm 132 may include a lower arm cover 131 to cover the top of lower arm 132, protect various components of lower arm assembly 130 and provide additional strength to mechanism 100. Lower arm cover 131 may move directly with lower arm 132. As shown schematically in FIG. 3D, assembly screws or fasteners 156 may be used to attach lower arm cover 131 and lower arm 132 together.

According to an exemplary embodiment as shown schematically in FIG. 3D, lower arm assembly 130 may include a sliding pivot or damper 134 to attach lower arm 132 to housing 110 in a movable manner. Damper 134 may be movable along at least a portion of the length of housing 110 (e.g., damper rail 112 as shown in FIG. 3C) and may rotate relative to lower arm 132. As damper 134 is moved along damper rail 112, the pin on the upper end of lower arm 132 may slide along the slot of housing 110 and along the portion of the length of housing 110.

According to an exemplary embodiment, damper 134 may comprise a gear with teeth that can interlock with and rotate along the gears on damper rail 112. Damper 134 may be attached in a rotatable manner to lower arm cover 131 and/or lower arm 132 (and may not be movable along the length of lower arm 132) such that, as damper 134 moves and rotates along damper rail 112, damper 134 rotates relative to lower arm 132 and allows lower arm 132 to slide along a portion of the length of housing 110, which changes the angle between lower arm 132 and housing 110.

According to an exemplary embodiment as shown schematically in FIG. 3D, lower arm assembly 130 may include a bell crank, a bell crank arm, control arm, inner arm, or guide 135. According to an exemplary embodiment, guide 135 may be configured to maintain a horizontal position of shelf 142 and move shelf 142 in a substantially linear path from the retracted position 242 to the extended position 246 through the intermediate position 244.

According to an exemplary embodiment, guide 135 may be positioned between lower arm cover 131 and lower arm 132 and may extend from the middle of lower arm 132 to the end of lower arm 132 as shown schematically in FIGS. 3D and 6A-6C. The upper end of guide 135 may be positioned in the middle of lower arm 132 and attached in a rotatable manner to a projecting portion 124 of upper arm 120 at an axis of rotation 182 such that rotation of upper arm 120 may cause guide 135 to rotate both with projecting portion 124 about axis of rotation 172 and relative to projecting portion 124 about axis of rotation 182. Axis of rotation 182 between guide 135 and upper arm 120 is parallel to, separate from and offset from axis of rotation 172 between upper arm 120 and lower arm 132.

According to an exemplary embodiment, the lower end of guide 135 may be attached in a rotatable manner to a lower portion of shelf assembly 140 at an axis of rotation 184 such that guide 135 is positioned below lower arm 132 as shown schematically in FIGS. 6A-6C. Axis of rotation 184 between guide 135 and shelf assembly 140 is parallel to, separate from and offset from axis of rotation 174 between lower arm 132 and shelf assembly 140. Axes of rotation 172, 174, 182 and 184 may be generally parallel to one another.

According to an exemplary embodiment, in order to move shelf 142 in a linear manner and maintain a horizontal position or orientation of shelf 142 through its full range of motion, guide 135 may provide a bell-crank type linkage. Guide 135 may comprise a substantially straight middle portion extending along a longitudinal axis and two end portions that are bent or angled away from the middle portion and do not extend along the longitudinal axis.

According to an exemplary embodiment, upper arm or pivotable guide member 120 may help guide movement of guide 135 to allow shelf 142 to move between various positions in a linear manner. As shown schematically in FIG. 3D, an upper end of upper arm 120 may be attached in a rotatable manner to a front end portion of housing 110 through a roll, guide, or pivot pin 152 with a fixed pivot (e.g., a fixed axis of rotation). Pivot pin 152 may facilitate rotation of upper arm 120 relative to housing 110 and may extend through at least a portion of both upper arm 120 and housing 110.

According to an exemplary embodiment as shown schematically in FIG. 3D, a lower end of upper arm 120 may be attached in a rotatable manner to a middle or center of lower arm 132 through another roll, guide, or pivot pin 155 that extends along axis of rotation 182. Pivot pin 155 may facilitate rotation between upper arm 120 and lower arm 132 and may extend through at least a portion of both upper arm 120 and lower arm 132.

Figure 6A:
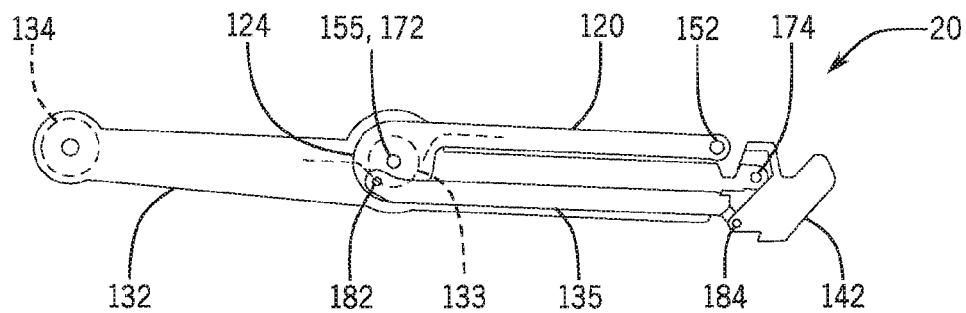
FIG. 6A is a schematic side view of a vehicle interior component in a retracted position according to an exemplary embodiment.
Figure 6B:
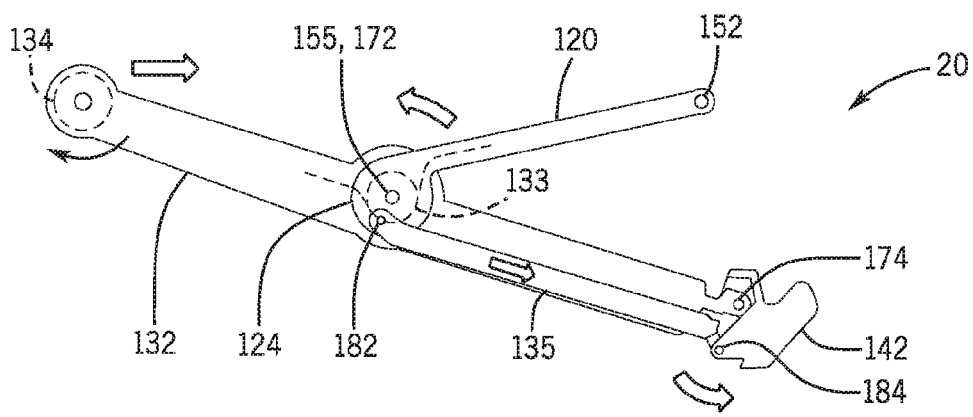
FIG. 6B is a schematic side view of a vehicle interior component in an intermediate position according to an exemplary embodiment.
Figure 6C:
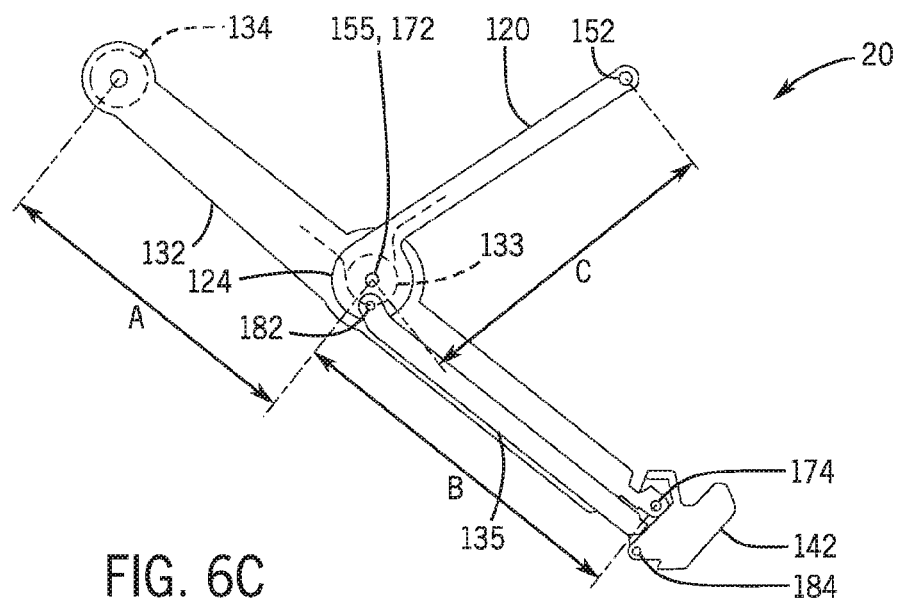
FIG. 6C is a schematic side view of a vehicle interior component in an extended position according to an exemplary embodiment.

According to an exemplary embodiment as shown schematically in FIGS. 6A through 6C, upper arm 120 may comprise a projecting portion 124 toward a lower end of upper arm 120 that projects beyond the connection point to the pivot pin and may be configured to rotate about axis of rotation 182 to move guide 135 up and down along the length of lower arm 132 as upper arm 120 rotates about axis of rotation 182 to maintain a horizontal position of shelf 142 during vertical movement of shelf 142.

According to an exemplary embodiment as shown schematically in FIGS. 5A through 5C, resilient member or spring 133 may be positioned between and connect a middle region of lower arm assembly 130 to an end region of upper arm 120 in order to bias shelf 142 upward toward the base 200, toward the retracted position 242 and away from the intermediate position 244 and the extended position 246 biasing lower arm 132 toward upper arm 120 and toward housing 110. When mobile device MD is placed in between shelf 142 and retainer 210 of base 200, the upward bias of shelf 142 due to spring 133 will result in a clamping force that holds mobile device MD in position. Due to spring 133, mechanism 100 is retractable when mobile device MD is removed.

According to an exemplary embodiment as shown schematically in FIG. 3D, spring 133 may comprise at least one of a damper spring, a torsion spring, or a dual coil spring. Spring 133 may comprise two distinct and separate coiled regions 166 that are separated by a first uncoiled region 162. The two coiled regions 166 may be substantially parallel to each other and may be made from the same continuous wire. Each of the coiled regions 166 may end in a second uncoiled region 164. As shown schematically in FIGS. 3D and 5A, first uncoiled region 162 and second uncoiled region 164 of spring 133 may be on opposite sides of coiled region 166 and may extend substantially parallel to each other in an unstressed condition (e.g., when shelf 142 is in the retracted position 242).

According to an exemplary embodiment, the dual coil spring configuration of spring 133 may allow mechanism 100 to have minimal packaging, easy assembly and lower cost, while providing balanced and symmetrical support and sufficient spring force to mobile device MD. An upper end of guide 135 may be positioned between each of the coiled regions 166 of spring 133 such that guide 135 is centered along a width of lower arm assembly 130 without increasing the thickness of lower arm assembly 130.

According to an exemplary embodiment as shown schematically in FIGS. 5A through 5C, spring 133 may be positioned in a middle of lower arm 132 and at a lower end of upper arm 120 such that pivot pin 155 and axis of rotation 172 extend through the middle of the coiled regions 166. The first uncoiled region 162 of spring 133 may extend into and attach to lower arm assembly 130 (e.g., positioned between lower arm cover 131 and lower arm 132). The second uncoiled regions 164 of spring 133 may extend into and attach to upper arm 120.

According to an exemplary embodiment, spring 133 may be positioned at an upper end of upper arm 120 such that pivot pin 152 extends through the middle of spring 133 and spring 133 is attached to upper arm 120 and housing 110 or instrument panel IP.

According to an exemplary embodiment, spring 133 is unstressed when the first uncoiled region 162 and the second uncoiled regions 164 are substantially parallel; spring 133 biases shelf 142 toward the retracted position 242 in which upper arm 120, lower arm 132 and housing 110 are substantially parallel. When mobile device MD is pressed onto shelf 142 toward the intermediate position 244 and the extended position 246, force exerted on mobile device MD may overcome a spring force of spring 133 and move spring 133 into a relatively more stressed configuration in which the first uncoiled region 162 and the second uncoiled regions 164 are no longer substantially parallel to each other. When mobile device MD is clamped between shelf 142 and base 200 in the extended position 246 (in the portrait position) or in the intermediate position 244 (in the landscape position), mobile device MD may prevent shelf 142 from moving toward retainer 210 of base 200 (e.g., toward the retracted position 242) to keep spring 133 in a stressed configuration. A spring force of spring 133 may be sufficiently high such that mobile device MD is clamped and retained securely and can be used by occupants while being retained (e.g., mobile device MD can be touched without displacing mobile device MD).

According to an exemplary embodiment, spring 133 may bias shelf 142 toward the retracted position 242 and shelf 142 may be moved or adjusted to a variety of different distances from retainer 210 of base 200; component 20 may support a variety of different sizes of mobile device MD. Component 20 may clamp and support mobile devices MD in desired orientations, such as in a vertical or portrait orientation (as shown schematically in FIG. 2B) or in a horizontal or landscape orientation (as shown schematically in FIG. 2C).

According to an exemplary embodiment shown schematically, spring 133 comprises a dual coil spring; a variety of other springs may be used (such as a single spring, two separate springs that are not joined, etc.). According to an exemplary embodiment, a constant force spring or a compression force spring may be positioned with damper 134 to apply a force to move an upper end of lower arm 132 to the left (with respect to FIG. 6C).

According to an exemplary embodiment, shelf 142 of shelf assembly 140 may be configured to receive mobile device MD in the retracted position 242 and/or the intermediate position 244 and support and secure mobile device MD in the intermediate position 244 and/or the extended position 246.

According to an exemplary embodiment, mechanism 100 may allow shelf assembly 140 to move shelf 142 from the retracted position 242 to the intermediate position 244 and from the intermediate position 244 to the extended position 246. Mechanism 100 may allow shelf assembly 140 to move shelf 142 from the extended position 246 to the intermediate position 244 and to the retracted position 242.

According to an exemplary embodiment, shelf assembly 140 may be coupled to base 200 through mechanism 100. Shelf assembly 140 may attach in a rotatable manner to lower arm assembly 130. Shelf assembly 140 may attach in a rotatable manner to an end of guide 135 and attach in a rotatable manner to an end of lower arm 132.

According to an exemplary embodiment, shelf assembly 140 may include a lower clamping surface or member, ledge, cradle, tray, or shelf 142 to directly contact and secure a lower edge of mobile device MD. Shelf 142 may comprise a ledge. As shown schematically in FIG. 5A, shelf 142 of shelf assembly 140 may be substantially U-shaped or may have a curved profile to receive and secure a lower edge of mobile device MD. An outer edge 148 of shelf 142 (e.g. an edge closest to occupants within vehicle V) may be thicker or extend higher than a middle or inner edge of shelf 142 to create a ledge or recessed region 146 for a lower contact surface. A lower edge of mobile device MD may be positioned within recessed region 146 and behind outer edge 148 of shelf 142. When recessed region 146 of shelf 142 is exposed, shelf 142 may be configured to at least receive a lower edge of mobile device MD.

According to an exemplary embodiment as shown schematically in FIG. 5B, recessed region 146 of shelf 142 may be slightly offset or displaced (along a horizontal or x-axis) with respect to recessed region 214 of retainer 210 in order to obtain a comfortable viewing angle of mobile device MD. When mobile device MD is secured within component 20 in the extended position 246 (when mobile device MD is in a portrait position) or in the intermediate position 244 (when mobile device MD is in a landscape position), mobile device MD may be oriented to be at least partially angled relative to a vertical or z-axis (as shown schematically in FIG. 5C) in order to allow a vehicle occupant to view mobile device MD more easily while mobile device MD is secured. Mobile device MD may extend along a plane to allow occupants within vehicle V to view a display screen of mobile device MD easily.

According to an exemplary embodiment as shown schematically in FIG. 3B, shelf 142 may include a gap, crevice, hole, aperture, or opening 141 that may provide an area for a cord or cable CA to extend through in order for cable CA to connect (or remain connected) to mobile device MD while mobile device MD is secured between shelf 142 and retainer 210 of base 200. Cable CA may be used to charge mobile device MD or to connect to an audio port of mobile device MD.

As shown schematically in FIG. 3D, shelf assembly 140 may include decorative elements or pieces or fascia 144 that are exposed in interior I of vehicle V for aesthetics.

According to an exemplary embodiment as shown schematically in FIGS. 4A-4F, shelf 142 or mechanism 100 may be configured to move between the retracted position 242, the intermediate position 244, and the extended position 246 in order to provide an area to secure mobile device MD (i.e., the extended position 246 and/or the intermediate position 244) or to be stowed (i.e., the retracted position 242). Shelf 142 or mechanism 100 may be moved from the retracted position 242 to the extended position 246 by pushing downward on shelf 142 against a restoring force of spring 133 (as shown schematically in FIG. 5B). Shelf 142 may move to the retracted position 242 by removing the downward force and allowing spring 133 to automatically move shelf 142 to the retracted position 242.

According to an exemplary embodiment as shown schematically in FIGS. 2A, 4A, 5A, and 6A, shelf 142 may be in the storage, upward, non-use, or retracted position 242 when mechanism 100 is stowed and not retaining mobile device MD and no downward force is applied to shelf assembly 140. Lower arm 132, guide 135, upper arm 120, and housing 110 may be substantially parallel to each other such that shelf 142 is relatively close to base 200.

According to an exemplary embodiment, shelf 142 may receive a lower edge of mobile device MD while still in the retracted position 242. A vehicle occupant may position mobile device MD with a hand H such that a lower edge of mobile device MD is received within recessed region 146 of shelf 142 of shelf assembly 140.

According to an exemplary embodiment, when a lower edge of mobile device MD has been received within recessed region 146, mobile device MD may be pressed or pushed with a downward force against shelf 142 (e.g. in a direction away from retainer 210 of base 200 and against a restoring force of spring 133) and shelf 142 may lower from the retracted position 242. A vehicle occupant may use a finger F or hand H to press a top edge of mobile device MD when a lower edge of mobile device MD is supported by shelf 142 allowing for single-handed operation of mechanism 100. According to an exemplary embodiment, hand H may press directly against any portion of shelf assembly 140 to move shelf 142 toward and into the extended position 246.

According to an exemplary embodiment, a load against mobile device MD from a vehicle occupant may be transferred through mobile device MD to shelf 142 and may oppose and overcome a spring force of spring 133 that biases shelf 142 toward the retracted position 242. Mechanism 100 is actuated or activated due to the movement of shelf 142 toward the extended position 246. Shelf 142 may be moved and displaced from the retracted position 242 toward the extended position 246.

According to an exemplary embodiment, as a lower end of lower arm assembly 130 is moved toward the intermediate position 244 and the extended position 246, an upper end of lower arm assembly 130 moves or slides to the right (with respect to FIGS. 6A-6C) and is guided by damper 134 moving along damper rail 112. Damper 134 may allow an upper end of lower arm assembly 130 to move to the right while pivoting clockwise (with respect to FIGS. 6A-6C) about damper 134 with respect to housing 110.

According to an exemplary embodiment, as a lower end of lower arm assembly 130 moves downward, lower arm assembly 130 may guide movement of a lower end of upper arm 120 and may cause a lower end of upper arm 120 to rotate counterclockwise about axis of rotation 172 (since the upper end of the upper arm 120 has a fixed axis of rotation). Rotation of upper arm 120 about axis of rotation 172 may cause guide 135 to rotate counterclockwise with upper arm 120 about axis of rotation 172 while rotating clockwise relative to upper arm 120 about axis of rotation 182, which moves guide 135 downward with respect to lower arm 132. Movement of guide 135 may push a lower side of shelf assembly 140 outward and downward, rotating shelf assembly 140 counterclockwise as shelf assembly 140 is moving downward and maintaining a horizontal position of shelf 142 throughout its movement between the retracted position 242, the intermediate position 244, and the extended position 246.

According to an exemplary embodiment, with shelf 142 adjusted sufficiently according to size and orientation or position of mobile device MD such that mobile device MD may fit in a gap between shelf 142 and retainer 210 of base 200, a top edge of mobile device MD may be moved into and aligned with recessed region 214 of retainer 210 to secure mobile device MD within component 20.

According to an exemplary embodiment as shown schematically in FIGS. 2C, 3A, 4B-4E, 5B, and 6B, shelf 142 may be positioned in a mid-position or intermediate position 244 between the retracted position 242 and the extended position 246. In the intermediate position 244, shelf 142 may be relatively further from base 200 than in the retracted position 242 and lower arm 132, upper arm 120 and housing 110 may not be parallel. Depending on the position of shelf 142 and orientation (e.g., landscape or portrait) of mobile device MD, shelf 142 may move toward the extended position 246 or may secure mobile device MD.

According to an exemplary embodiment, with mobile device MD positioned in a landscape position as shown schematically in FIG. 2C, mobile device MD may be secured by shelf 142 in the intermediate position 244 and shelf 142 may press mobile device MD against retainer 210 of base 200. With mobile device MD positioned in a portrait position as shown schematically in FIG. 5B or with shelf 142 not positioned to secure mobile device MD, mobile device MD may not be secured by shelf 142 and shelf 142 may transition toward the extended position 246. A top edge of mobile device MD may not be secured within recessed region 214 of retainer 210 of base 200 in such a configuration.

According to an exemplary embodiment as shown schematically in FIGS. 2B, 2C, 3B, 3C, 4F, 5C, and 6C, shelf 142 may be in the use, lower, down, clamping, deployed, or extended position 246 when mobile device MD is in a portrait position and supported and secured within component 20 by mechanism 100 and base 200. Shelf 142 may press mobile device MD against retainer 210 of base 200. In the extended position 246, shelf 142 may be relatively further from base 200 than in the retracted position 242 and the intermediate position 244 and lower arm 132, upper arm 120, and housing 110 may not be parallel.

According to an exemplary embodiment, shelf 142 may clamp mobile device MD to base 200 when shelf 142 is in the extended position 246. Shelf 142 and retainer 210 of base 200 may clamp and secure mobile device MD between shelf 142 and retainer 210 of base 200 when shelf 142 is in the intermediate position 244 or the extended position 246 to secure mobile device. A bottom edge of mobile device MD may be received within recessed region 146 of shelf 142 and a top edge of mobile device MD may be received within recessed region 214 of retainer 210 of base 200. Due to a biasing or clamping force of spring 133 toward the retracted position 242, mobile device MD may be clamped securely between shelf 142 and retainer 210 of base 200. Location of shelf 142 while in the intermediate position 244 and the extended position 246 may depend on a size (e.g., the length) and orientation of mobile device MD.

According to an exemplary embodiment, in order to move shelf 142 to the retracted position 242, mobile device MD may be removed from component 20 by pushing mobile device MD to release a top edge of mobile device MD from recessed region 214 of retainer 210. Removal of mobile device MD from component may allow spring 133 to automatically move shelf 142 to the retracted position 242 due to an upward biasing of spring 133. For shelf 142 to move from the extended position 246 to the retracted position 242, various components of component 20 follow the reverse movements of moving shelf 142 from the retracted position 242 to the extended position 246.

According to an exemplary embodiment as shown schematically in FIGS. 6A through 6C, shelf 142 is guided by mechanism 100 in a substantially linear manner (e.g., generally approximating a linear motion as may be perceived) between the retracted position 242, the intermediate position 244, and the extended position 246. Shelf 142 may be moved between various positions such that the orientation of shelf 142 is substantially constant in and between each position. An angle of mobile device MD relative to base 200 may be substantially constant in and between each position (e.g., the angle between shelf 142 and retainer 210 of base 200 may remain substantially constant). Linear movement of shelf 142 allows a viewing angle of mobile device MD secured within component 20 to remain constant and controlled, regardless of a size or orientation of mobile device MD.

According to an exemplary embodiment, the configuration and rotational relationships between the arms within component 20 (in particular guide 135), shelf 142 may be moved in a substantially linear path between the retracted position 242 and the extended position 246. Shelf 142 may only move in a vertical direction (as shown schematically in FIG. 5B) and may not substantially move in a horizontal direction (e.g., along an axis parallel to a horizontal or x-axis as shown schematically in FIG. 5B).

According to an exemplary embodiment, a ratio of a length of upper arm 120 to lower arm 132 may allow shelf 142 to move in a linear and vertical manner. A length A of lower arm 132 is shown schematically in FIG. 6C as a distance between the center of damper 134 and the center of axis of rotation 172. A length B of lower arm 132 is shown schematically in FIG. 6C as a distance between the center of axis of rotation 172 and the center of axis of rotation 174. A length C of upper arm 120 is shown schematically in FIG. 6C as a distance between the center of axis of rotation 172 and the center of pivot pin 152. Lengths A, B, and C may be equal to allow shelf 142 to move in a linear fashion.

According to an exemplary embodiment, positions of lower arm 132, upper arm 120, guide 135, and shelf assembly 140 may be dependent on each other due to the rotatable connections between each of them and the resulting four-bar linkage (e.g., guide 135, the portion of shelf assembly 140 between axis of rotation 184 and axis of rotation 174, the portion of lower arm 132 between axis of rotation 174 and axis of rotation 172, and the portion of upper arm 120 between axis of rotation 172 and axis of rotation 182).

According to an exemplary embodiment, mobile device MD may be positioned in component 20 such that a display screen of mobile device MD may face interior I of vehicle V to allow vehicle occupants to view the display screen and access forward-facing buttons and controls of mobile device MD while mobile device MD is retained within component 20.

According to an exemplary embodiment, component 20 may comprise various attachment mechanisms for different components to attach to each other. As shown schematically in FIG. 3D, clips 151 and mounting screws or fasteners 153 may attach to each other through housing 110 to attach housing 110 to a portion of base 200 of component 20.

According to an exemplary embodiment, component 20 provides for one or a combination of advantageous features for single-handed or single motion placement of mobile device MD into mechanism 100. Such advantageous features may include: generally linear motion of shelf 142 to keep a viewing angle of mobile device MD consistent, maintained generally horizontal orientation of shelf 142 and mobile device MD when placed in shelf 142 to ensure consistent contact with mobile device MD through a range of motion, location/installation in or under instrument panel IP (e.g., near the centerline of vehicle V or, according to an exemplary embodiment, mechanism 100 may be located elsewhere in vehicle V to be accessible for vehicle occupants, such as in a floor console or overhead console, in a compartment or location for rear-seat occupants, in a rear or a floor console, etc.), secure holding of mobile devices MD in a variety of orientations, providing for access to charging/data ports on mobile device MD while being secured, and/or unobstructed access to an area when in the retracted position 242. According to an exemplary embodiment, at least portions of component 20 may be inverted and designed to be used in an inverted orientation.

According to an exemplary embodiment, component 20 is configured to hold and retain any of a variety of types/forms of mobile devices MD in a variety of orientations/modes (e.g. portrait or landscape) to facilitate convenience and effective use in vehicle V. Component 20 may comprise mechanism 100 configured to retain mobile device MD securely according to a size/dimension and orientation of mobile device MD and in a manner such that mobile device MD is convenient to a vehicle occupant and to any connection or connections that mobile device MD may require for useful operation (e.g. power/charging or data/communication including wireless connection). Component 20 may comprise or be integrated or installed at or adjacent instrument panel IP of vehicle V to facilitate convenient and efficient use and connectivity of mobile device MD.

Figure 7:
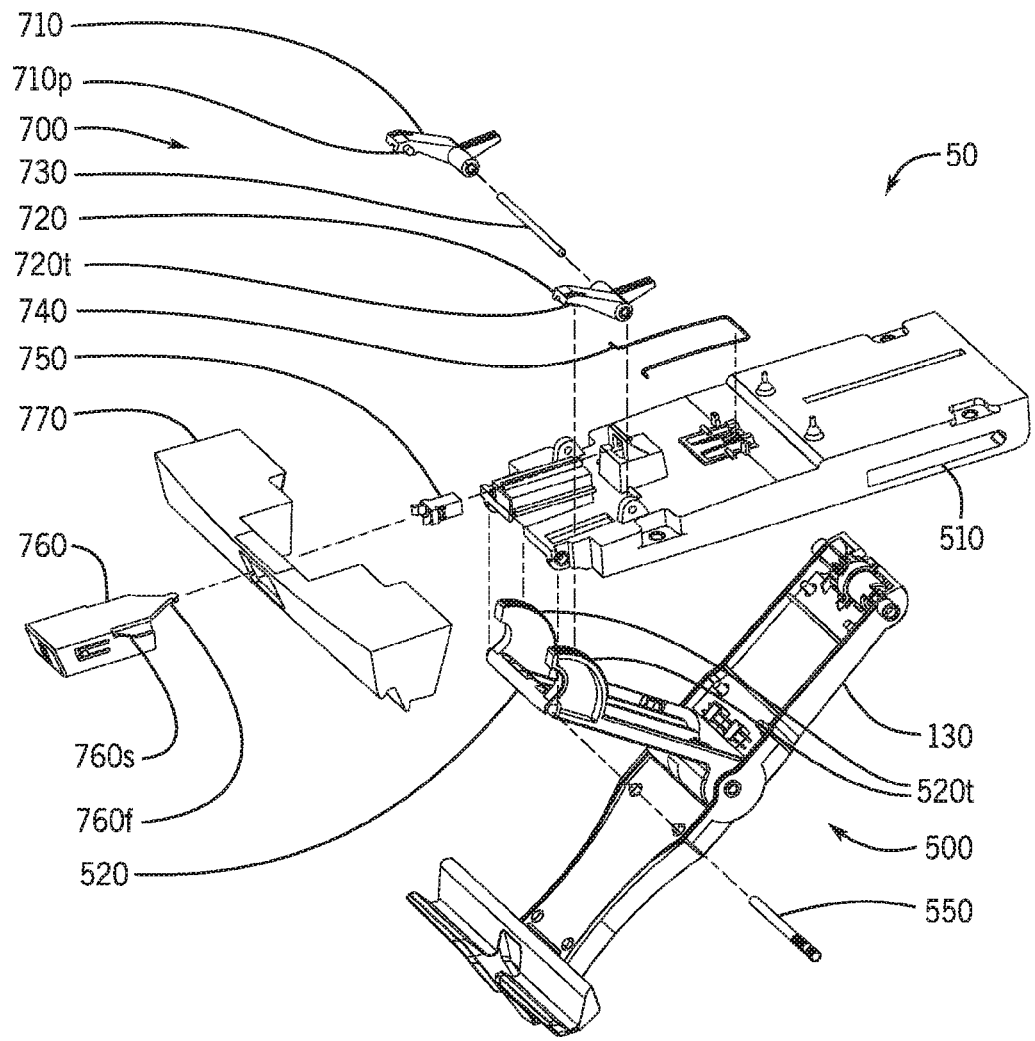
FIG. 7 is a schematic perspective exploded view of a vehicle interior component according to an exemplary embodiment.
Figure 8A:
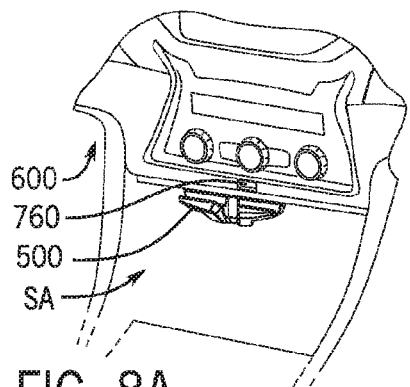
FIG. 8A is a schematic perspective view of a vehicle interior component in a retracted position according to an exemplary embodiment.
Figure 8B:
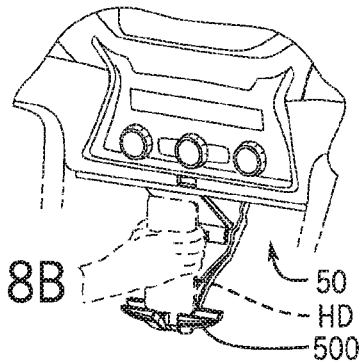
FIG. 8B is a schematic perspective view of a vehicle interior component in an intermediate position according to an exemplary embodiment.
Figure 8C:
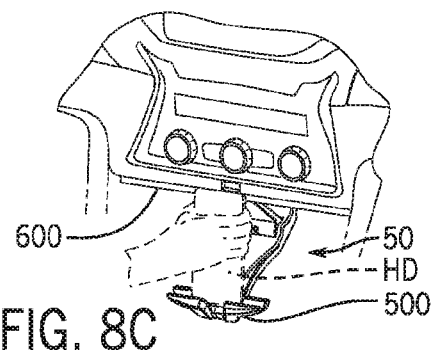
FIGS. 8C and 8D are schematic perspective views of a vehicle interior component in an extended position according to an exemplary embodiment.
Figure 8D:
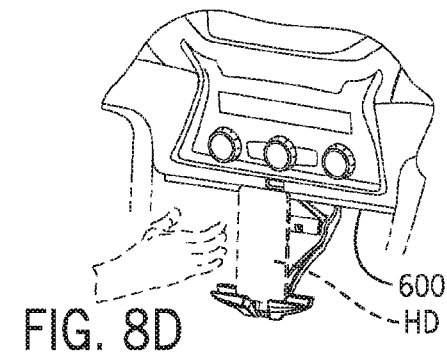
Figure 8E:
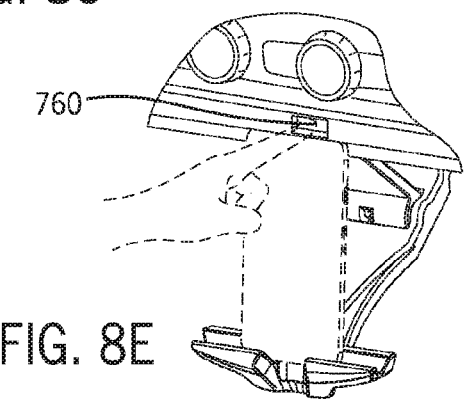
FIGS. 8E through 8H are schematic partial perspective views of a vehicle interior component in an extended position according to an exemplary embodiment
Figure 8F:
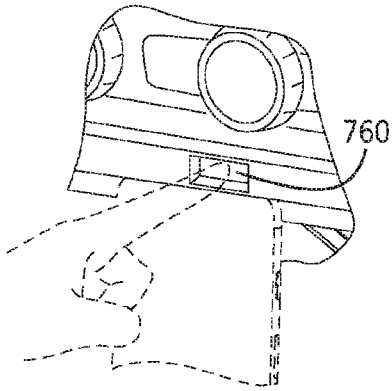
Figure 8G:
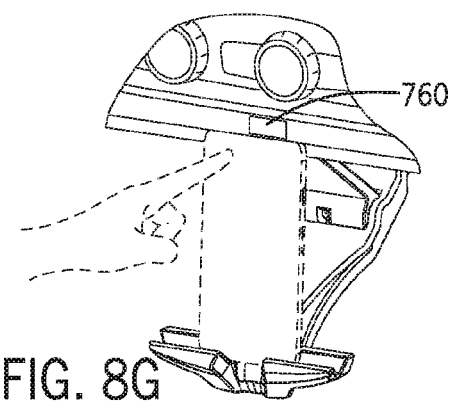
Figure 8H:
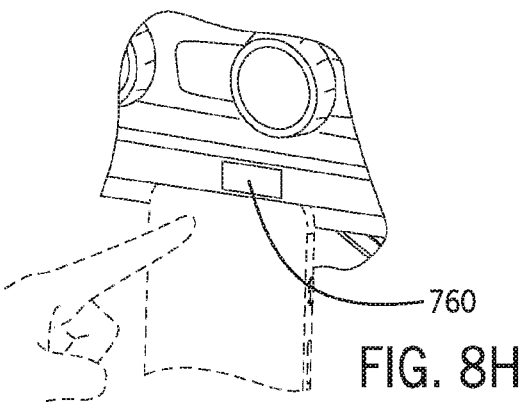

According to an exemplary embodiment as shown schematically in FIG. 7, a vehicle interior component 50 may comprise a mechanism 500 and a locking mechanism 700. As shown schematically in FIG. 8A, component 50 may comprise a base 600.

According to an exemplary embodiment as shown schematically in FIG. 7, mechanism 500 may comprise a housing 510, a lower arm assembly 130 (see FIG. 3D), an upper arm 520, a pin 550 and a latch feature 750 of base 600. Mechanism 500 or upper arm 520 may comprise a set of teeth 520t. Pin 550 may be configured to couple upper arm 520 to housing 510 and enable upper arm 520 to rotate relative to housing 510. Housing 510 may be coupled to or fixed to base 600. Locking mechanism 700 may comprise at least one locking arm 710/720, a pin 730, a spring 740, a button 760 and a cover 770. Locking arm 710 may comprise a set of teeth 710t. Locking arm 710 may comprise a protrusion 710p. Locking arm 720 may comprise a set of teeth 720t. Locking arm 720 may comprise a protrusion 710p. Button 760 may comprise a latch feature 760f. Button 760 may comprise at least one surface 760s. Pin 730 may be configured to couple locking arm 710 and locking arm 720 to housing 510 and enable locking arm 710 and locking arm 720 to rotate relative to housing 510 and upper arm 520. Latch feature 750 may be coupled to housing 510 or base 600 (see FIG. 8A). Spring 740 may be coupled to housing 510. Spring 740 may comprise a leg configured to contact locking arm 710 and a leg configured to contact locking arm 720. Cover 770 may be coupled to or fixed to base 600 (see FIG. 8A).

According to an exemplary embodiment as shown schematically in FIGS. 8A through 8H, component 50 may be configured to position a handheld, electronic or mobile device HD for use in a vehicle interior. Component 50 may comprise a base 600 a shelf configured to move from a retracted position (FIG. 8A) to an extended position (FIGS. 8C through 8H) relative to base 600. The shelf may be configured to support mobile device HD in the extended position. Component 50 may comprise a locking mechanism 700 as shown schematically in FIG. 7 configured to lock the shelf in the extended position. Locking mechanism 700 may comprise a button 760. Button 760 may be configured to allow movement of the shelf relative to the base (FIGS. 8A through 8D). Button 760 may be configured to block movement of the shelf relative to base 600 (FIGS. 8G and 8H) to lock the shelf in the extended position.

According to an exemplary embodiment as shown schematically in FIGS. 9A through 9F, component 50 may be configured to position a handheld, electronic or mobile device HD for use in a vehicle interior. Component 50 may be configured to position mobile device HD in a portrait position (FIGS. 9A through 9F) and in a landscape position (FIG. 11A through 11F). Component 50 may comprise a shelf configured to move to an extended position to support mobile device HD and a locking mechanism 700 as shown schematically in FIG. 7 configured to lock the shelf in the extended position. Locking mechanism 700 may comprise a button 760. Button 760 may be configured to block movement of the shelf relative to the base (FIGS. 9E and 9F) to lock the shelf in the extended position.

Figure 9A:
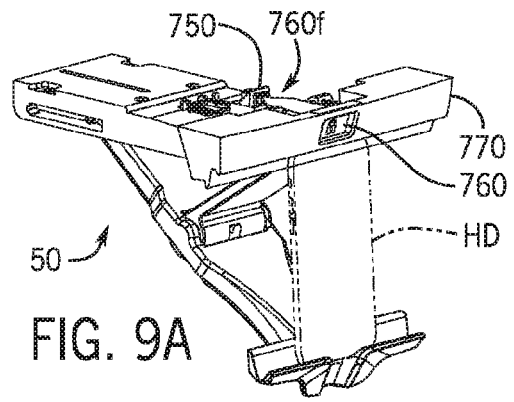
FIG. 9A is a schematic perspective view of a vehicle interior component in an extended position according to an exemplary embodiment.
Figure 9B:
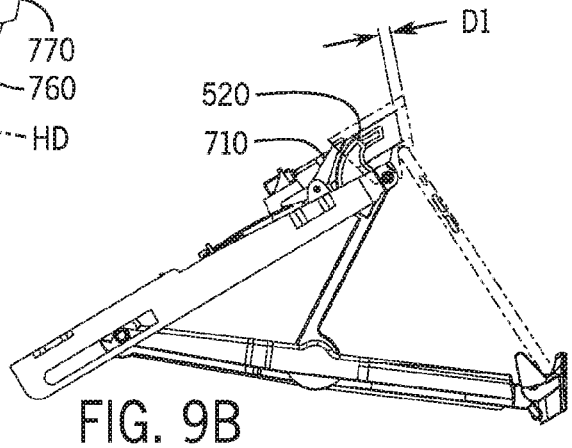
FIG. 9B is a schematic section view of a vehicle interior component in an extended position according to an exemplary embodiment.

According to an exemplary embodiment as shown schematically in FIG. 9A, the locking mechanism of component 50 may comprise a latch feature 750 and button 760. Button 760 may comprise a latch feature 760f configured to engage latch feature 750 to allow movement of the shelf relative to the base. The locking mechanism or base may comprise a cover 770. Button 760 may be configured to move relative to cover 770. As shown schematically in FIG. 9B, a front surface of button 760 may be spaced away from a front surface of cover 770 by a distance D1 to indicate that shelf is not locked and may be adjusted. Locking arm 710 may be spaced away from upper arm 520 of mechanism 500.

Figure 9C:
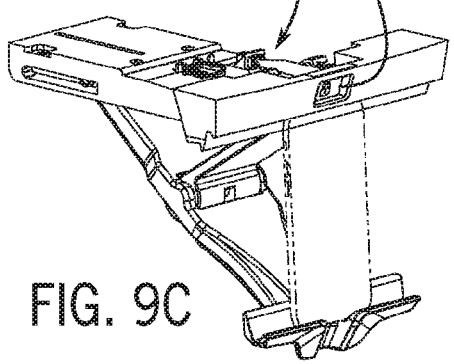
FIG. 9C is a schematic perspective view of a vehicle interior component in an extended position according to an exemplary embodiment.
Figure 9D:
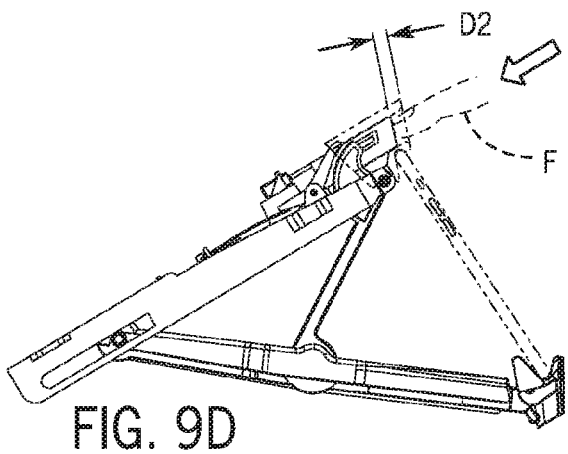
FIG. 9D is a schematic section view of a vehicle interior component in an extended position according to an exemplary embodiment.

According to an exemplary embodiment as shown schematically in FIGS. 9C and 9D, a finger F may provide a force to move, depress, or push button 760 relative to cover 770 so that the front surface of button 760 may be spaced away from the front surface of cover 770 by a distance D2 greater than distance D1. In response to movement of button 760 relative to cover 770, latch feature 760f of button 760 is configured to disengage from latch feature 750.

Figure 9E:
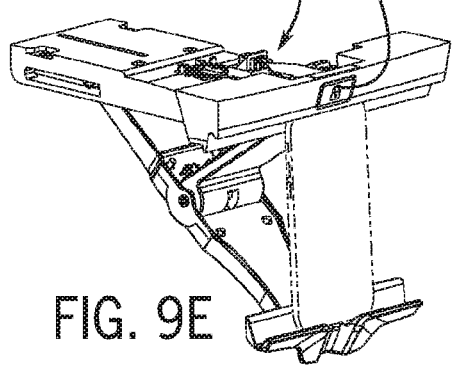
FIG. 9E is a schematic perspective view of a vehicle interior component in an extended position according to an exemplary embodiment.
Figure 9F:
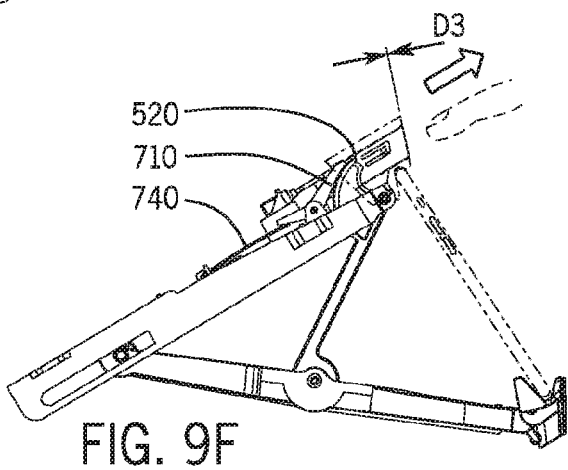
FIG. 9F is a schematic section view of a vehicle interior component in an extended position according to an exemplary embodiment.

According to an exemplary embodiment as shown schematically in FIGS. 9E and 9F, finger F may remove the force from button 760 to allow button 760 to move relative to cover 770 so that the front surface of button 760 may be spaced away from the front surface of cover 770 by a distance D3 less than distance D1. In response to movement of button 760 relative to cover 770, locking arm 710 may be configured to move or to rotate to engage upper arm 520 of mechanism 500 to lock the shelf in the extended position. Spring 740 may be configured to move locking arm 710 to engage upper arm 520 of mechanism 50 to lock the shelf in the extended position.

Figure 10A:
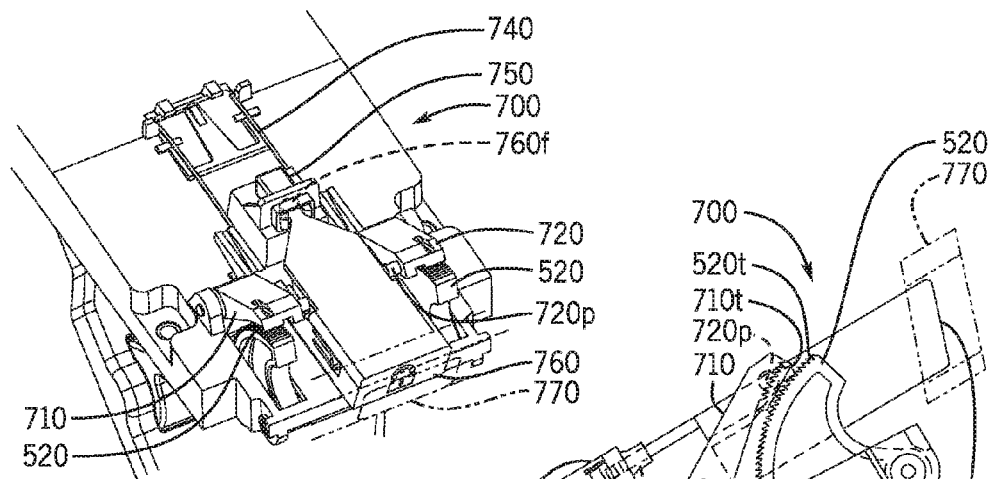
FIG. 10A is a schematic partial perspective view of a vehicle interior component according to an exemplary embodiment.
Figure 10B:
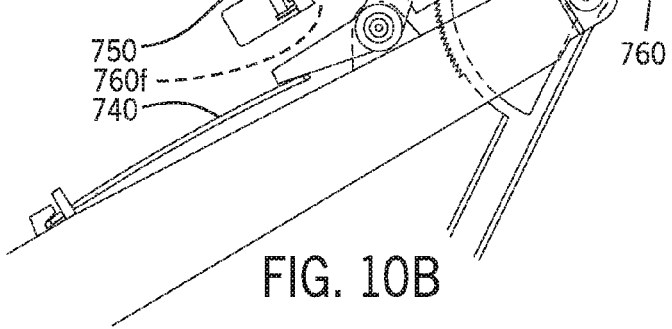
FIG. 10B is a schematic partial section view of a vehicle interior component according to an exemplary embodiment.

According to an exemplary embodiment as shown schematically in FIGS. 10A and 10B, locking mechanism 700 may comprise a latch feature 750 and button 760. Button 760 may comprise a latch feature 760f configured to engage latch feature 750 to allow movement of the shelf relative to the base. Locking mechanism 700 may comprise a cover 770. Button 760 may be configured to move relative to cover 770. When latch feature 760f is engaged with latch feature 750 as shown schematically in FIGS. 10A and 10B, protrusion 710p of locking arm 710 and protrusion 720p of locking arm 720 may be supported by surfaces 760s of button 760 to hold locking arms 710 and 720 disengaged from upper arms 520 of mechanism 500 to allow movement of the shelf relative to the base. Engagement of latch feature 760f with latch feature 750 may deflect spring 740 or hold spring 740 in a deflected position. Engagement of latch feature 760f with latch feature 750 may hold button in a position relative to cover 770. When latch feature 760f is engaged with latch feature 750 as shown schematically in FIGS. 10A and 10B, set of teeth 710t may be disengaged from set of teeth 520t to allow movement of the shelf relative to the base. When latch feature 760f is engaged with latch feature 750 as shown schematically in FIG. 10A, set of teeth 710t may be disengaged from set of teeth 520t to allow movement of the shelf relative to the base.

Figure 10C:
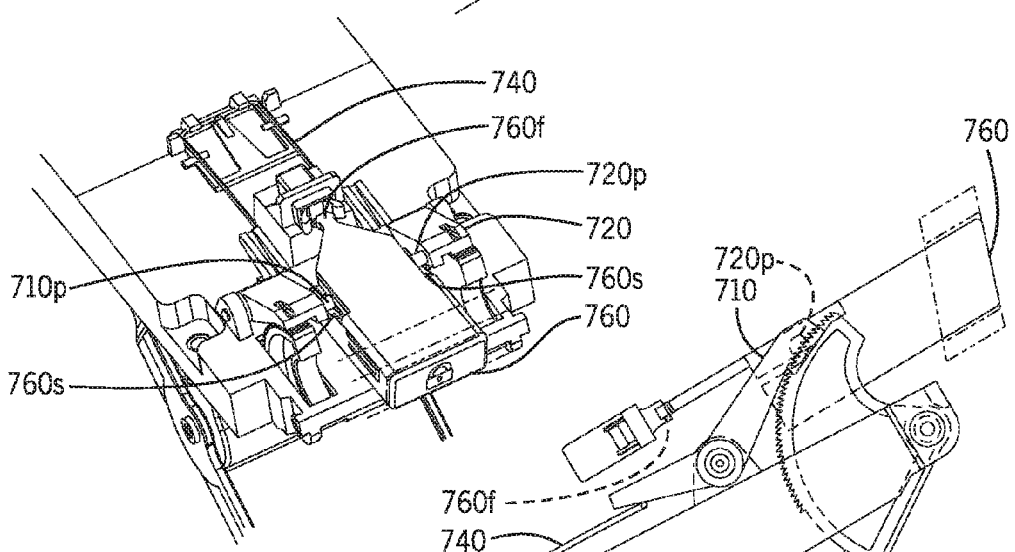
FIG. 10C is a schematic partial perspective view of a vehicle interior component according to an exemplary embodiment.
Figure 10D:
FIG. 10D is a schematic partial section view of a vehicle interior component according to an exemplary embodiment.

According to an exemplary embodiment as shown schematically in FIGS. 10C and 10D, latch feature 760f may be configured to disengage latch feature 750 to block or prevent movement of the shelf relative to the base. When latch feature 760f is disengaged from latch feature 750 as shown schematically in FIGS. 10C and 10D, locking arms 710 and 720 may not be supported by surfaces of button 760s and may engage upper arms 520 of the mechanism to block or prevent movement of the shelf relative to the base. Disengagement of latch feature 760f from latch feature 750 may allow movement of spring 740 to move at least one of locking arms 710 and 720 into engagement with upper arms 520 of mechanism 500 to block or prevent movement of the shelf relative to the base. Disengagement of latch feature 760f with latch feature 750 may allow movement of button relative to cover 770. When latch feature 760f is disengaged from latch feature 750 as shown schematically in FIGS. 10C and 10D, set of teeth 710t may engage set of teeth 520t to block or prevent movement of the shelf relative to the base. When latch feature 760f is disengaged from latch feature 750 as shown schematically in FIG. 10A, set of teeth 710t may engage set of teeth 520t to block or prevent movement of the shelf relative to the base.

Figure 11A:
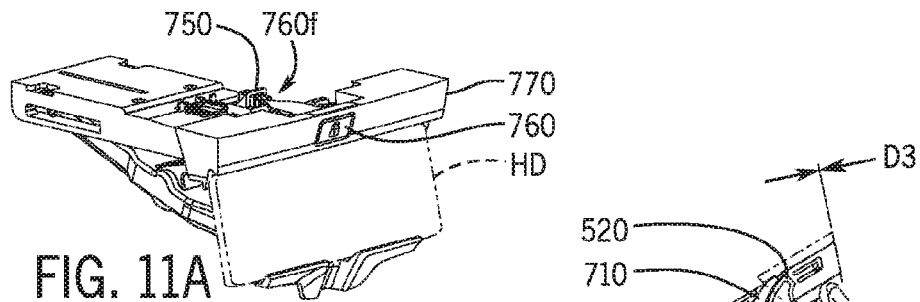
FIG. 11A is a schematic perspective view of a vehicle interior component in an extended position according to an exemplary embodiment.
Figure 11B:
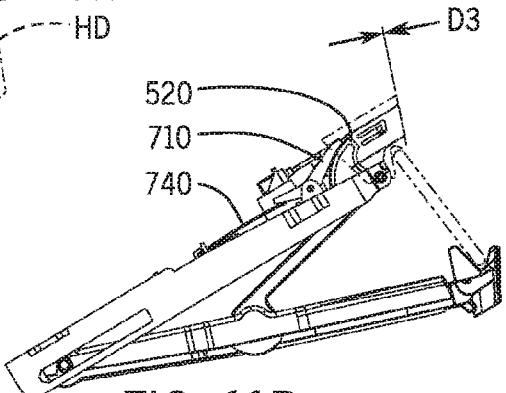
FIG. 11B is a schematic section view of a vehicle interior component in an extended position according to an exemplary embodiment.

According to an exemplary embodiment as shown schematically in FIGS. 11A and 11B, front surface of button 760 may be spaced away from the front surface of cover 770 by a distance D3. Locking arm 710 may be engaged with upper arm 520 of the mechanism to lock the shelf in the extended position. Spring 740 may be configured to bias locking arm 710 to engage upper arm 520 of the mechanism to lock the shelf in the extended position.

Figure 11C:
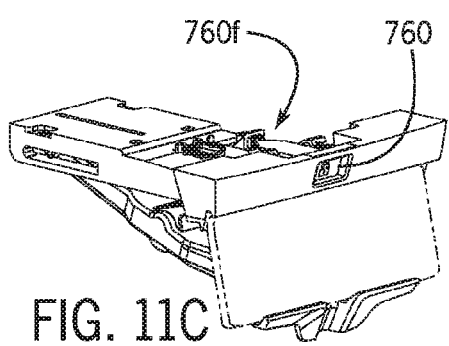
FIG. 11C is a schematic perspective view of a vehicle interior component in an extended position according to an exemplary embodiment.
Figure 11D:
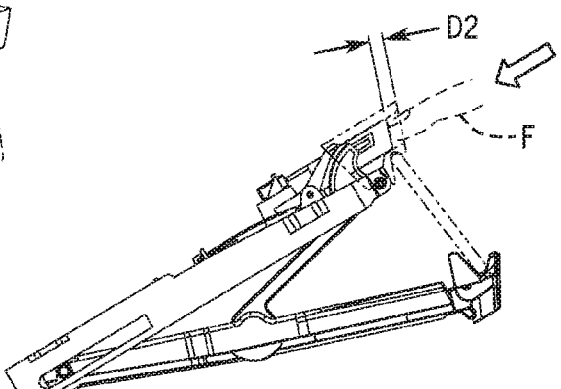
FIG. 11D is a schematic section view of a vehicle interior component in an extended position according to an exemplary embodiment.

According to an exemplary embodiment as shown schematically in FIGS. 11C and 11D, finger F may provide a force to button 760 to move button 760 relative to cover 770 so that the front surface of button 760 may be spaced away from the front surface of cover 770 by a distance D2 greater than distance D3. In response to movement of button 760 relative to cover 770, locking arm 710 may be configured to move or to rotate to disengage from upper arm 520 of the mechanism to unlock the shelf. In response to movement of button 760 relative to cover 770, locking arm 710 may deflect spring 740. Surface 760s of button 760 may rotate locking arm 710 to disengage locking arm 710 from upper arm 520 of the mechanism. (See FIG. 10A.)

Figure 11E:
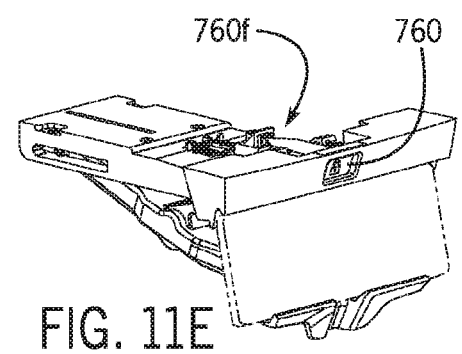
FIG. 11E is a schematic perspective view of a vehicle interior component in an extended position according to an exemplary embodiment.
Figure 11F:
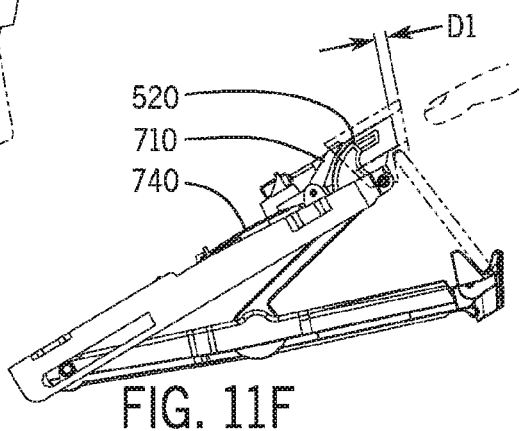
FIG. 11F is a schematic section view of a vehicle interior component in an extended position according to an exemplary embodiment.

According to an exemplary embodiment as shown schematically in FIGS. 11E and 11F, finger F may release force from button 760 to move button 760 relative to cover 770 so that the front surface of button 760 may be spaced away from the front surface of cover 770 by a distance D1 greater than distance D3. Latch feature 760f may engage latch feature 750 to allow movement of the shelf relative to the base. As shown schematically in FIG. 11F, a front surface of button 760 may be spaced away from a front surface of cover 770 by a distance D1 to indicate that shelf is not locked and may be adjusted.

Referring generally to the FIGURES, the present application discloses various embodiments of components with support mechanisms and apparatus to easily position, manage, and support mobile devices in the vehicle interior of a vehicle. The support mechanism can be easily adjusted to support different shapes, sizes, and orientations of mobile devices. According to an exemplary embodiment, the shelf of the support mechanism is moved in a substantially linear manner along the vertical axis to maintain the desired viewing angle of the mobile device, regardless of the size of the mobile device.

The embodiments described and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

It is important to note that the construction and arrangement of the elements of the inventive concepts and inventions as described in the present application and as shown in the figures is illustrative only. Although some embodiments of the present inventions have been described in detail in the present disclosure, those skilled in the art who review the present disclosure will readily appreciate that many modifications are possible without materially departing from the novel teachings and advantages of the subject matter recited. All such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) any other applicable technology (present or future) that has the capability to perform the functions and processes/operations indicated in the FIGURES. All such technology is considered to be within the scope of the present inventions and application.

The invention claimed is:

1. A component for a vehicle interior configured to position a mobile device in a portrait orientation or a landscape orientation for use in the vehicle interior comprising:
   (a) a base; and
   (b) a mechanism coupled to the base comprising a shelf configured to move from a retracted position to an extended position;
   wherein the shelf is configured to support the mobile device in the extended position;
   wherein the mechanism comprises a lower arm pivotally coupled with an upper arm;
   wherein the mechanism is configured to bias the lower arm to clamp the mobile device between the shelf and the base when the shelf is in the extended position;
   wherein the extended position of the mechanism comprises a first extended position and a second extended position; and
   wherein the lower arm of the mechanism is configured for movement of the shelf (1) to the first extended position to clamp the mobile device between the shelf and the base in the portrait orientation and (2) to the second extended position to clamp the mobile device between the shelf and the base in the landscape orientation.

2. The component of claim 1 wherein the lower arm is configured to move the shelf relative to the base between the retracted position and the extended position.

3. The component of claim 1 wherein the lower arm is configured to slide and rotate relative to the base to move the shelf between the retracted position and the extended position.

4. The component of claim 1 wherein the upper arm is configured to rotate relative to the base to move the shelf relative to the base between the retracted position and the extended position.

5. The component of claim 1 comprising a pin configured to facilitate rotation between the upper arm and the lower arm.

6. The component of claim 1 comprising a spring configured to couple the lower arm to the upper arm; wherein the spring is configured to bias the shelf toward the retracted position.

7. The component of claim 1 wherein the mechanism comprises a gear.

8. A component for a vehicle interior configured to position a mobile device for use in the vehicle interior comprising:
   (a) a base; and
   (b) a mechanism coupled to the base comprising a shelf configured to move from a retracted position to an extended position;
   wherein the shelf is configured to support the mobile device in the extended position; and wherein the mechanism is configured to descend from the base to move the shelf from the retracted position to the extended position.

9. The component of claim 8 wherein the base comprises a storage area and wherein the storage area is exposed when the shelf is in the retracted position.

10. The component of claim 8 wherein the base comprises a storage area and wherein the mechanism at least partially covers the storage area when the shelf is in the extended position.

11. The component of claim 8 wherein the mechanism is configured to clamp the mobile device between the shelf and the base when the shelf is in the extended position.

12. The component of claim 8 wherein the shelf comprises an opening for a cable extending from the mobile device.

13. The component of claim 8 wherein the mechanism comprises a first arm coupled to the base and a second arm coupled to the base and wherein the first arm and the second arm are configured to guide movement of the shelf between the retracted position and the extended position.

14. A component for a vehicle interior configured to position a mobile device for use in the vehicle interior comprising:
  (a) a base;
  (b) a mechanism coupled to the base comprising a shelf configured to move from a retracted position to an extended position; and
  (c) a locking mechanism configured to lock the shelf in the extended position;
  wherein the locking mechanism comprises at least one locking arm; and
  wherein the at least one locking arm is configured to engage the mechanism to lock the shelf in the extended position.

15. The component of claim 14 wherein the locking mechanism comprises a button and a latch feature; wherein the button comprises a latch feature; wherein the latch feature of the button is configured to engage the latch feature of the locking mechanism to allow movement of the shelf relative to the base.

16. The component of claim 15 wherein the latch feature of the button is configured to disengage from the latch feature of the mechanism to block movement of the shelf relative to the base.

17. The component of claim 14 wherein the locking mechanism comprises a button; and wherein the at least one locking arm is configured to rotate in response to actuation of the button to engage the mechanism to lock the shelf in the extended position.

18. The component of claim 17 wherein the locking mechanism comprises a spring; wherein the spring is configured to rotate the at least one locking arm to engage the at least one locking arm with the mechanism to lock the shelf in the extended position.

19. The component of claim 14 wherein the locking mechanism comprises a button; and wherein the button comprises a surface configured to rotate the at least one locking arm to disengage the at least one locking arm from the mechanism.

20. The component of claim 14 wherein the mechanism comprises a set of teeth and the at least one locking arm comprises a set of teeth; wherein the set of teeth of the at least one locking arm is configured to engage the set of teeth of the mechanism to lock the shelf in the extended position.

* * * * *